(12) United States Patent
Sato et al.

(10) Patent No.: US 7,455,602 B2
(45) Date of Patent: Nov. 25, 2008

(54) GOLF BALL

(75) Inventors: Katsunori Sato, Chichibu (JP); Atsuki Kasashima, Chichibu (JP); Hideo Watanabe, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/713,634

(22) Filed: Mar. 5, 2007

(65) Prior Publication Data

US 2008/0220901 A1 Sep. 11, 2008

(51) Int. Cl.
*A63B 37/12* (2006.01)
(52) U.S. Cl. ..................................... 473/383
(58) Field of Classification Search ............... 473/378, 473/383, 384, 385, 373, 374
See application file for complete search history.

(56) References Cited

U.S. PATENT DOCUMENTS

| | | | |
|---|---|---|---|
| 5,306,760 A | 4/1994 | Sullivan | |
| 5,312,857 A | 5/1994 | Sullivan | |
| 5,830,085 A | 11/1998 | Higuchi et al. | |
| 6,561,925 B2 | 5/2003 | Watanabe et al. | |
| 6,592,470 B2 | 7/2003 | Watanabe et al. | |
| 6,666,780 B2 | 12/2003 | Watanabe | |
| 6,679,791 B2 | 1/2004 | Watanabe | |
| 7,066,842 B2 | 6/2006 | Sato et al. | |
| 7,390,272 B2 * | 6/2008 | Kasashima et al. | 473/383 |
| 2001/0016522 A1 * | 8/2001 | Watanabe et al. | 473/371 |
| 2005/0239579 A1 * | 10/2005 | Sato et al. | 473/378 |
| 2007/0021238 A1 | 1/2007 | Sato et al. | |

FOREIGN PATENT DOCUMENTS

| | | |
|---|---|---|
| JP | 2002-764 A | 1/2002 |
| JP | 2002-765 A | 1/2002 |
| JP | 2002-315848 A | 10/2002 |
| JP | 3505922 B2 | 12/2003 |
| JP | 3685248 B2 | 10/2005 |
| JP | 2005-305152 A | 11/2005 |
| JP | 2006-95281 A | 4/2006 |
| JP | 2006-116308 A | 5/2006 |
| WO | WO 98/46671 A1 | 10/1998 |

* cited by examiner

*Primary Examiner*—Raeann Trimiew
(74) *Attorney, Agent, or Firm*—Sughrue Mion, PLLC

(57) ABSTRACT

The invention provides a golf ball composed of a core, a cover, and an intermediate layer between the core and the cover, which ball has a surface with a plurality of non-circular dimples thereon. The cover is harder than the intermediate layer. The ball surface has land areas with intervals therebetween of from 0.05 to 1.0 mm, the lands having outer surfaces that define an outermost peripheral face of the ball. The non-circular dimples have non-circular inside corners that are curved. The ball satisfies conditions (I) to (IV) below:

(I) (core initial velocity)−(ball initial velocity)≧0;
(II) 0.87≦(deflection of intermediate layer-covered sphere)/(core deflection)≦0.97;
(III) combined thickness of intermediate layer and cover≦3.0 mm; and
(IV) (ball deflection)/(deflection of intermediate layer-covered sphere)≦0.98.

The golf ball of the invention has an increased distance and a stable flight performance.

12 Claims, 3 Drawing Sheets

GOLF BALL

BACKGROUND OF THE INVENTION

The present invention relates to a golf ball which is composed of a core, a cover, and an intermediate layer therebetween, and which has a plurality of dimples on the surface thereof. More specifically, the invention relates to a golf ball which achieves an increased distance due to an improved aerodynamic performance arising from the presence thereon of dimples of a distinctive shape and to a low-spin construction.

It is customary to place numerous dimples on the surface of a golf ball. A number of disclosures have been made describing art in which non-circular dimples are arranged among circular dimples so as to increase the dimple coverage on the surface of the ball and thereby improve the aerodynamic performance (JP-A 2005-305152, JP-A 2006-095281, JP-A 2006-116308, JP-A 2002-315848, JP-A 2002-000764, JP-A 2002-000765, JP No. 3685248 and JP No. 3505922).

However, in non-circular dimples having polygonal and other planar shapes as viewed from directly above, the presence of many acutely or obtusely angular corners increases frictional resistance to air, which interferes with the aerodynamic performance of the ball. Moreover, when the internal construction of the golf ball is designed so as to increase the spin rate of the ball, the dimples do not function effectively, making it difficult to increase the distance traveled by the ball.

SUMMARY OF THE INVENTION

It is therefore an object of the invention to provide a golf ball which achieves a better flight performance through a novel dimple appearance in combination with an appropriate spin performance and rebound.

The inventors have conducted extensive investigations, as a result of which they have found that, by forming high trajectory-type dimples on the surface of a golf ball and by providing such dimples on a ball having a low-spin construction, the distance traveled by the ball can be increased while allowing the ball to retain an aesthetically pleasing and original appearance. This discovery ultimately led to the golf ball of the present invention.

The dimple surface coverage is generally regarded as contributing to the flight of a golf ball, a larger surface coverage being thought to provide a better aerodynamic performance. In the present invention, the shapes of the land areas are examined in order to increase the dimple surface coverage; by optimizing the shape of those land areas, the aerodynamic performance of the ball is improved. In the prior art, when only circular dimples are used on the surface of a golf ball, the practical upper limit in the collective dimple surface area coverage relative to the total surface area of the sphere is about 75% (that is, the surface area of the lands represents a coverage of about 25%). With the dimple shapes used in the present invention, although there have been areas of instability in the flight performance at increased spin rates, by incorporating within the invention a ball construction that stably provides a low spin rate, the performance of the dimples can be maximized. That is, because the dimples designed for a high trajectory that are used in the invention tend to result in a high arc, they are suitable on balls having a low spin-type construction. However, the dimples used in the present invention are inappropriate on balls which are highly receptive to spin because they tend to shorten the distance traveled by the ball.

Accordingly, in the golf ball of the invention, the combination of a reduced air resistance owing to the dimple shapes with a low-spin construction provides the ball with an increased distance and a stable flight performance.

The invention provides the following golf balls.

[1] A golf ball comprising a core, a cover, and an intermediate layer between the core and the cover, which ball has a surface with a plurality of non-circular dimples thereon, wherein the cover is harder than the intermediate layer, the ball surface has land areas with intervals therebetween of from 0.05 to 1.0 mm, the lands having outer surfaces that define an outermost peripheral face of the ball, the non-circular dimples have non-circular inside corners that are curved, and the ball satisfies conditions (I) to (IV) below:

(I) (core initial velocity)−(ball initial velocity)≧0;

(II) 0.87≦(deflection of intermediate layer-covered sphere)/(core deflection)≦0.97;

(III) combined thickness of intermediate layer and cover≦3.0 mm; and (IV) (ball deflection)/(deflection of intermediate layer-covered sphere)≦0.98.

[2] The golf ball of [1], wherein the core is made of a rubber composition comprising 100 parts by weight of a base rubber, from 0.05 to 0.5 part by weight of sulfur and from 0.05 to 5 parts by weight of an organosulfur compound, and the organosulfur compound and the sulfur together satisfy the condition:

1≦(amount of organosulfur compound)/(amount of sulfur)≦30.

[3] The golf ball of [1] having on the surface thereof a mixture of circular dimples and non-circular dimples.

[4] The golf ball of [1], wherein circular dimples account for at least 30% of the total number of dimples.

[5] The golf ball of [1], wherein the number of dimples is between 250 and 350.

[6] The golf ball of [1], wherein the cover has a thickness of between 0.5 and 2.0 mm and a type D durometer hardness of at least 52 but not more than 62, the intermediate layer has a thickness of between 0.5 and 1.6 mm and a type D durometer hardness of at least 40 but not more than 60, and the ball has an initial velocity of at least 76.5 m/s.

[7] The golf ball of [1] which satisfies, as condition (IV), the relationship:

0.85≦(ball deflection)/(deflection of intermediate layer-covered sphere)≦0.95.

[8] The golf ball of [1], wherein the intermediate layer includes (A) an ionomer resin composed of (a-1) an olefin-unsaturated carboxylic acid random copolymer and/or a metal ion neutralization product of an olefin-unsaturated carboxylic acid random copolymer and (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio (a-1)/(a-2) of between 100/0 and 0/100, and (B) a non-ionomeric thermoplastic elastomer in a weight ratio A/B of between 100/0 and 50/50.

[9] The golf ball of [8], wherein the intermediate layer is made of a mixture comprised of 100 parts by weight of a resin component which includes the ionomer resin (A) and the non-ionomeric thermoplastic elastomer (B) in a weight ratio A/B of between 100/0 and 50/50, (C) between 5 and 80 parts by weight of an organic fatty acid having a molecular weight of between 280 and 1500 and/or a derivative thereof, and (D) between 0.1 and 10 parts by weight of a basic inorganic metal compound capable of neutralizing the un-neutralized acid groups in the resin component and component C.

[10] The golf ball of [1], wherein the dimples have a surface coverage, based on the surface area of the ball, of at least 75%.

BRIEF DESCRIPTION OF THE DIAGRAMS

DETAILED DESCRIPTION OF THE INVENTION

Figure 4:
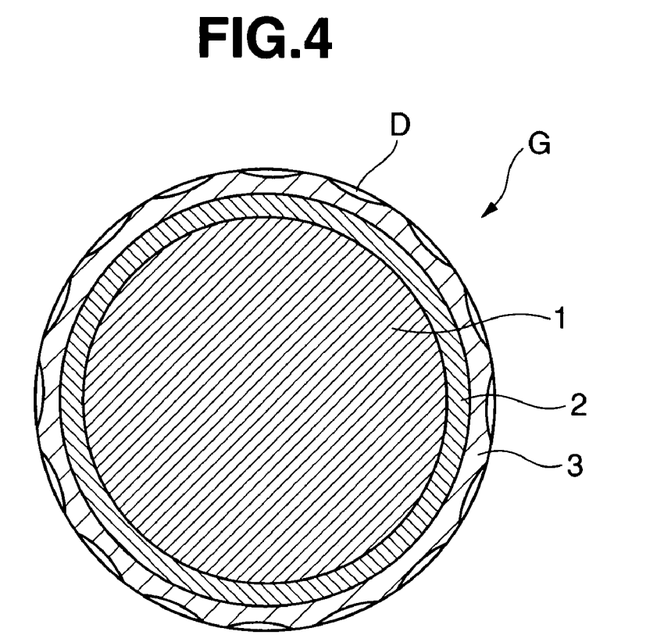
FIG. 4 is a cross-sectional view of a multi-piece solid golf ball.

As noted above, the present invention is directed at a golf ball composed of a core, a cover, and an intermediate layer therebetween. The ball has a plurality of dimples on the surface thereof. FIG. 4 shows, as an example thereof, a multi-piece solid golf ball G which is composed of a core 1, a cover 3 having a plurality of dimples D thereon, and an intermediate layer 2 therebetween.

The core in the invention may be made of, for example, a rubber composition containing, together with a base rubber, such ingredients as a co-crosslinking agent, an organic peroxide, an inert filler and an organosulfur compound. The base rubber in the rubber composition is preferably one composed primarily of a known polybutadiene.

In the practice of the invention, it is preferable to include sulfur in the base rubber. The amount of sulfur included per 100 parts by weight of the base rubber is typically between 0.05 and 0.5 part by weight, preferably between 0.07 and 0.3 part by weight, and more preferably between 0.09 and 0.2 part by weight. If too little sulfur is included, a sufficient hardness difference may not be achieved between the surface of the core and the center of the core. On the other hand, if too much sulfur included, the core rebound resilience may become too low, lowering the rebound of the ball, which may result in a shorter than desirable distance.

In working the invention, it is preferable to include an organosulfur compound in the base rubber. The amount of the organosulfur compound included per 100 parts by weight of the base rubber is typically between 0.05 and 5 parts by weight, preferably between 0.1 and 4 parts by weight, and more preferably between 0.2 and 2 parts by weight. If too little organosulfur compound is included in the core, the rebound resilience of the core may become too low, lowering the rebound of the ball, which may result in a shorter than desirable distance. On the other hand, if too much organosulfur compound is included, the core hardness may be too low, resulting in a poor feel when the ball is played and a poor durability to cracking on repeated impact.

Optimizing the relative proportions in which the above organosulfur compound and sulfur are included in the rubber composition is desirable for increasing the rebound resilience of the molded core. Specifically, it is desirable for the ratio (amount of organosulfur compound)/(amount of sulfur) to be at least 1 but not more than 30, preferably at least 3 but not more than 25, and more preferably at least 5 but not more than 20. If this ratio is too small, the ball may have a low rebound and thus fail to travel as far as desired. On the other hand, if the ratio is too large, the ball may become too soft and the hardness difference between the surface of the core and the center of the core may be insufficient, as a result of which the ball may take on too much spin, compromising the advantageous effects of the invention.

The core has a diameter of typically at least 36.8 mm but not more than 41.8 mm, preferably at least 37.2 mm but not more than 40.8 mm, and more preferably at least 37.6 mm but not more than 38.8 mm.

The core deflection, which is the amount of deformation by the core when compressed under a final load of 130 kgf from an initial load of 10 kgf, is typically between 2.5 and 5.5 mm, preferably between 3.0 and 4.5 mm, and more preferably between 3.3 and 4.0 mm. If the core is harder than the above range, the ball may take on too much spin, which is inappropriate for the dimples in the present invention. On the other hand, if the core is softer than the above range, the ball may have too low a rebound and thus fail to travel as far as desired, the feel on impact may be too soft, and the durability to cracking on repeated impact may worsen.

It is desirable for the surface of the core to have a lower hardness than the intermediate layer. If the surface of the core is harder than the surface of the intermediate layer, the spin rate of the ball may increase, which is inappropriate for the dimples used in the invention.

The core surface hardness, as measured with a type D durometer in accordance with ASTM D2240 (referred to below as "type D durometer hardness"), is typically at least 45 but not more than 65, preferably at least 50 but not more than 62, and more preferably at least 53 but not more than 60. If the core surface is harder than the above range, the spin rate may rise excessively, which is inappropriate for the dimples of the invention. On the other hand, if the surface of the core is softer than the above range, the ball may have too low a rebound and thus fail to travel as far as desired, the feel on impact may be too soft, and the durability to cracking on repeated impact may worsen.

The core center hardness, expressed as the type D durometer hardness, is typically at least 30 but not more than 50, preferably at least 33 but not more than 45, and more preferably at least 35 but not more than 40. If the center of the core is harder than the above range, the spin rate may rise excessively, which is inappropriate for the dimples of the invention. On the other hand, if the center of the core is softer than the above range, the ball may have too low a rebound and thus fail to travel as far as desired, the feel on impact may be too soft, and the durability to cracking on repeated impact may worsen.

The hardness difference between the surface of the core and the center of the core, that is, the value (core surface hardness)−(core center hardness) expressed in type D durometer hardness units, is generally at least 12 but not more than 30, preferably at least 13 but not more than 25, and more preferably at least 15 but not more than 23. If this hardness difference is smaller than the above range, the ball may become too susceptible to spin, which is inappropriate for the dimples of the invention. On the other hand, if this hardness difference is too large, the durability of the ball to cracking on repeated impact may worsen or the initial velocity of the ball when hit with a number one wood (W#1) may decrease, as a result of which the ball may fail to travel as far as desired.

In the practice of the invention, the core is enclosed by the intermediate layer, and the intermediate layer is in turn enclosed by the subsequently described cover having one or more cover layer.

The intermediate layer material used may be one having a type D durometer hardness of at least 40 but not more than 60, preferably at least 45 but not more than 55, and more preferably at least 48 but not more than 52. If the intermediate layer material is softer than the above range, the spin rate of the ball may rise excessively and the rebound of the ball may decrease, which is undesirable for the dimples of the invention. On the other hand, if the intermediate layer material is harder than the above range, the durability to cracking on repeated impact may worsen. If the intermediate layer material is harder or softer than the above range, the spin rate of the ball when hit with a W#1 will increase, which is inappropriate for the dimples of the invention.

The intermediate layer material used in the present invention, while not subject to any particular limitation, is preferably a mixture prepared by blending together: 100 parts by weight of a resin component containing (A) an ionomer resin which includes
- (a-1) an olefin-unsaturated carboxylic acid random copolymer and/or a metal ion neutralization product of an olefin-unsaturated carboxylic acid random copolymer and
- (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio (a-1)/(a-2) of between 100/0 and 0/100, and
(B) a non-ionomeric thermoplastic elastomer, in a weight ratio A/B of preferably between 100/0 and 50/50;
(C) between 5 and 80 parts by weight of an organic fatty acid having a molecular weight of between 280 and 1500 and/or a derivative thereof, and
(D) between 0.1 and 10 parts by weight of a basic inorganic metal compound capable of neutralizing the un-neutralized acid groups in the resin component and component C.

The olefin in above components (a-1) and (a-2) has a number of carbons which is generally at least 2 but not more than 8, and preferably not more than 6. Specific examples of such olefins include ethylene, propylene, butene, pentene, hexene, heptene and octene. Ethylene is especially preferred.

Examples of the unsaturated carboxylic acid include acrylic acid, methacrylic acid, maleic acid and fumaric acid. Acrylic acid and methacrylic acid are especially preferred.

Moreover, the unsaturated carboxylic acid ester in above component (a-2) is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a-1) and the olefin-unsaturated carboxylic acid-unsaturated carboxylic acid ester random terpolymer of component (a-2) (the copolymers in components (a-1) and (a-2) are sometimes referred to collectively below as "the random copolymers") can each be obtained by using a known method to carry out the random copolymerization of the olefin, the unsaturated carboxylic acid and, if necessary, the unsaturated carboxylic acid ester that are respectively mentioned above.

It is preferable for the above random copolymers to have controlled unsaturated carboxylic acid contents (acid contents). Here, it is recommended that the content of unsaturated carboxylic acid present in component (a-1) be generally at least 4 wt %, preferably at least 6 wt %, more preferably at least 8 wt %, and even more preferably at least 10 wt %, but not more than 30 wt %, preferably not more than 20 wt %, more preferably not more than 18 wt %, and even more preferably not more than 15 wt %. Similarly, it is recommended that the content of unsaturated carboxylic acid present in component (a-2) be generally at least 4 wt %, preferably at least 6 wt %, and more preferably at least 8 wt %, but not more than 15 wt %, preferably not more than 12 wt %, and even more preferably not more than 10 wt %. If the unsaturated carboxylic acid content of component (a-1) and/or component (a-2) is too low, the material may have a lower resilience, whereas if it is too high, the material may have a lower processability.

The metal ion neutralization product of the olefin-unsaturated carboxylic acid random copolymer of component (a-1) and the metal ion neutralization product of the olefin-unsaturated carboxylic acid-unsaturated carboxylic acid ester random terpolymer of component (a-2) (the metal ion neutralization products of the copolymers in components (a-1) and (a-2) are sometimes referred to collectively below as "the metal ion neutralization products of the random copolymers") can be obtained by neutralizing some or all of the acid groups on the random copolymers with metal ions.

Illustrative examples of metal ions for neutralizing the acid groups in the above random copolymers include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred. To improve resilience, the use of Na+ is especially preferred.

The method for using such metal ions to obtain the metal ion neutralization products of the above random copolymers should be one that involves neutralization by the addition of, for example, a formate, acetate, nitrate, carbonate, bicarbonate, oxide, hydroxide or alkoxide of the above-mentioned metal ions. No particular limitation is imposed on the degree of neutralization of the above acid groups by these metal ions.

Commercially available products may be used as above components (a-1) and (a-2). Illustrative examples of the random copolymer in component (a-1) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Illustrative examples of the metal ion neutralization product of the random copolymer in component (a-1) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), Iotek 3110 and Iotek 4200 (ExxonMobil Chemical). Illustrative examples of the random copolymer in component (a-2) include Nucrel AN4311 and Nucrel AN4318 (both products of DuPont-Mitsui Polychemicals Co., Ltd.), and Escor ATX325, Escor ATX320 and Escor ATX310 (all products of ExxonMobil Chemical). Illustrative examples of the metal ion neutralization product of the random copolymer in component (a-2) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Each of these respective components may be composed of one such product alone or a combination of two or more thereof. Sodium-neutralized ionomer resins that are suitable as the metal ion neutralization product of the random copolymer include Himilan 1605, Himilan 1601 and Surlyn 8120.

The amount of above component (a-2), as a proportion of the combined amount of components (a-1) and (a-2), is 0 wt % or more, preferably at least 50 wt %, and up to 100 wt %.

The non-ionomeric thermoplastic elastomer serving as above component B is preferably included to further improve the feel of the golf ball on impact and the rebound of the ball. In this specification, the ionomer resin (A) and the non-ionomeric thermoplastic elastomer (B) are sometimes referred to collectively as "the resin component."

Illustrative examples of the non-ionomeric thermoplastic elastomer used as component B include olefin elastomers, styrene elastomers, polyester elastomers, urethane elastomers and polyamide elastomers. To further increase the resilience of the material, it is preferable to use an olefin elastomer or a polyester elastomer.

A commercially available product may be used as component B. Illustrative examples include the olefin elastomer Dynaron (JSR Corporation) and the polyester elastomer Hytrel (DuPont-Toray Co., Ltd.). These may be used singly or as a combination of two or more thereof.

Component B is included in an amount, as a proportion of the above resin components, of 0 wt % or more, and preferably at least 15 wt %, but not more than 50 wt %, and preferably not more than 40 wt %. When the amount of component B as a proportion of the resin components exceeds 50 wt %, the compatibility of the different ingredients may decrease, possibly resulting in a substantial decline in the durability of the golf ball.

Component C in the invention is an organic fatty acid and/or organic fatty acid derivative having a molecular weight of at least 280 but not more than 1500. Compared with the resin component, this component has a very low molecular weight and, by suitably adjusting the melt viscosity of the mixture, helps in particular to improve the flow properties.

The organic fatty acid of component C has a molecular weight of at least 280, preferably at least 300, more preferably at least 330, and even more preferably at least 360, but not more than 1500, preferably not more than 1000, even more preferably not more than 600, and most preferably not more than 500. If the molecular weight is too low, the heat resistance may diminish. On the other hand, if the molecular weight is too high, it may not be possible to improve the flow properties.

An unsaturated organic fatty acid containing a double bond or triple bond on the alkyl moiety or a saturated organic fatty acid in which the bonds on the alkyl moiety are all single bonds may be suitably used as the organic fatty acid serving as component C.

The number of carbons on one molecule of the organic fatty acid is typically at least 18, preferably at least 20, more preferably at least 22, and even more preferably at least 24, but not more than 80, preferably not more than 60, more preferably not more than 40, and even more preferably not more than 30. Too few carbons may result in a poor heat resistance and may also make the acid group content so high as to diminish the flow-improving effect due to excessive interactions with acid groups present in the resin component. On the other hand, too many carbons increases the molecular weight, which may prevent a distinct flow-improving effect from being achieved.

Specific examples of the organic fatty acid of component C in the invention include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

The organic fatty acid derivative of component C is exemplified by metallic soaps in which the proton on the acid group of the organic fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of organic fatty acid derivatives that may be used as component C include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred. These may be used singly or as combinations of two or more thereof.

This component C is included in an amount, per 100 parts by weight of the resin component made up of components A and B, of at least 5 parts by weight, preferably at least 10 parts by weight, more preferably at least 15 parts by weight, and even more preferably at least 18 parts by weight, but not more than 80 parts by weight, preferably not more than 40 parts by weight, more preferably not more than 25 parts by weight, and even more preferably not more than 22 parts by weight. If the amount of component C is too small, the melt viscosity may be too low, resulting in a decline in processability. On the other hand, too much component C may lower the durability.

In the practice of the invention, a known metal soap-modified ionomer (see, for example, U.S. Pat. Nos. 5,312,857, 5,306,760, and International Application WO 98/46671) may be used as the mixture of above-described ionomer resin (component A) with above component C.

Component D in the invention is a basic inorganic metal compound capable of neutralizing un-neutralized acid groups in the resin components and above component C. If component D is not included, when a metal soap-modified ionomer resin or the like is used alone, the metallic soap and un-neutralized acid groups present on the ionomer resin may undergo exchange reactions during mixture under heating, generating a large amount of fatty acid which may in turn cause molding defects, diminished paint film adhesion, and other undesirable effects such as a decline in the resilience of the resulting molded material. For these reasons, it is desirable to include component D.

Component D is preferably a compound which has a high reactivity with the resin components and for which there are no organic acids in the reaction by-products.

Illustrative examples of the metal ion in component D include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. These may be used singly or as combinations of two or more thereof. Known basic inorganic fillers containing these metal ions may be used as component D. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. The use of calcium hydroxide or magnesium oxide, which have a high reactivity with the base resin, is preferred.

Component D is included in an amount, per 100 parts by weight of the above resin components, of at least 0.1 part by eight, preferably at least 0.5 part by weight, more preferably at least 1 part by weight, and even more preferably at least 2 parts by weight, but not more than 10 parts by weight, preferably not more than 8 parts by weight, more preferably not more than 6 parts by weight, and even more preferably not more than 5 parts by weight. Too little component D fails to improve thermal stability and resilience, whereas too much instead lowers the heat resistance of the golf ball-forming material due to the presence of excess basic inorganic metal compound.

The degree of neutralization of the mixture obtained by mixing together above components A to D, based on the total amount of acid groups in the mixture, is at least 50 mol %, preferably at least 60 mol %, more preferably at least 70 mol %, and even more preferably at least 80 mol %. By adopting such a high degree of neutralization, even if a metal soap-modified ionomer resin is used, exchange reactions between the metallic soap and un-neutralized acid groups present in the ionomer resin are less likely to arise during mixture under heating, reducing the possibility of a loss in thermal stability, moldability and resilience.

In addition to above components A to D, the intermediate layer material in the invention may include also additives such as pigments, dispersants, antioxidants, ultraviolet absorbers and light stabilizers. The amount in which such additives are included, while not subject to any particular limitation, is typically at least 0.1 part by weight, preferably at least 0.5 part by weight, and more preferably at least 1 part by weight, but typically not more than 10 parts by weight, preferably not more than 6 parts by weight, and more preferably not more than 4 parts by weight, per 100 parts by weight of the resin components.

The intermediate layer has a thickness (gauge) of typically between 0.5 and 1.7 mm, preferably between 0.8 and 1.4 mm, and more preferably between 1.1 and 1.3 mm. If the intermediate layer gauge is lower than the above range, the durability of the ball to cracking under repeated impact may worsen, and the rebound may decrease, resulting in a distance of travel that is shorter than desired. On the other hand, if the intermediate layer gauge is higher than the above range, the spin rate of the ball may increase, which is inappropriate for the dimples of the invention.

Next, the cover is described.

The material used to form the cover may be the same as the above-described material used to form the intermediate layer.

The cover material has a hardness, expressed as the type D durometer hardness, of preferably at least 52 but not more than 62, more preferably at least 55 but not more than 61, and even more preferably at least 57 but not more than 60. If the cover material is softer than the above range, the ball may take on too much spin and may have a poor rebound, which is inappropriate for the dimples of the invention. Moreover, in this case, the ball may have a poor scuff resistance. On the other hand, if the cover material is harder than the above range, the ball may have a lower durability to cracking under repeated impact, the feel on impact in the short game or when played with a putter may worsen, and the ball may lack sufficient controllability on approach shots.

In working the invention, it is critical for the cover to be formed so as to be harder than the intermediate layer. That is, the hardness difference between the cover and the intermediate layer, expressed in type D durometer hardness units, is larger than 0, preferably up to 30, more preferably between 3 and 20, and even more preferably between 5 and 15. If this hardness difference is too small or too large, the ball may take on too much spin, which would be inappropriate for the dimples used in the present invention.

The cover has at least one layer, and may formed as a plurality of two or more layers. In the invention, the thickness of the cover layer situated on the outermost side of the cover (referred to below as the "outermost layer") is preferably at least 0.5 mm but not more than 2.0 mm, more preferably at least 0.9 mm but not more than 1.6 mm, and even more preferably at least 1.1 mm but not more than 1.3 mm.

The melt flow rate (MFR) of the above cover material is typically at least 1.5, preferably at least 2.2, and more preferably at least 2.6. If the MFR is lower than the above range, molding may be difficult and the ball may have a lower degree of sphericity, possibility increasing the variance in the flight performance. As used herein, "melt flow rate" (sometimes abbreviated below as "MFR") refers to a value measured at a test temperature of 190° C. and under a test load of 21.18 N (2.16 kgf) in accordance with JIS K-6760.

The method of forming the intermediate layer and the cover is not subject to any particular limitation. For example, to blend the above materials and obtain the cover stock, mixture may be carried out under heating at a temperature of between 150 and 250° C. in an internal mixer such as a kneading-type twin-screw extruder, a Banbury mixer or a kneader. The method of incorporating the various additives other than the resin materials to form the cover material, while not subject to any particular limitation, is exemplified by a method in which the additives are blended together with the resin material and at the same time mixed under heating, and a method in which the essential ingredients are first mixed together under heating, following which the optional additives are added and further mixing under heating is carried out.

The intermediate layer and the cover may be formed by a known injection molding or compression molding process. When injection molding is employed, the process may involve placing a prefabricated solid core at a given position in an injection molding mold, then introducing the above-described material into the mold. When compression molding is employed, the process may involve producing a pair of half cups from the above-described material, enclosing the core with these cups, either directly or over an intermediate layer therebetween, then applying heat and pressure within a mold.

In the practice of the invention, it is essential also for the following conditions (I) to (IV) to be satisfied.

(I) core initial velocity−ball initial velocity≧0;
(II) 0.87≦(deflection of intermediate layer-covered sphere)/(core deflection)≦0.97;
(III) combined thickness of intermediate layer and cover≦3.0 mm; and
(IV) (ball deflection)/(deflection of intermediate layer-covered sphere)≦0.98.

Condition (I)

The value expressed as (core initial velocity)−(ball initial velocity) must be at least 0 m/s, and is preferably at least 0.2 m/s, and more preferably at least 0.4 m/s. By having the core initial velocity be larger than the ball initial velocity in this way, the rubber core makes a larger contribution to the rebound of the ball and the ball is more readily conferred with a soft feel. If the above value is too small, it may not be possible to produce a ball having a good rebound, good controllability and a soft feel.

The initial velocities (m/s) of the core and the ball are measured values obtained using an initial velocity measuring apparatus of the same type as the USGA drum rotation-type initial velocity instrument approved by the R&A. The ball is temperature-conditioned for at least 3 hours in a 23±1° C. environment, then tested in a 23±2° C. chamber by being hit with a 250-pound (113.4 kg) head (striking mass) at an impact velocity of 143.8 ft/s (43.83 m/s). One dozen balls are each hit four times. The time taken for the ball to traverse a distance of 6.28 ft (1.91 m) is measured and used to compute the initial velocity (m/s) of the ball. This cycle is carried out over a period of about 15 minutes.

The ball initial velocity is generally at least 76.5 m/s, preferably at least 76.8 m/s, and more preferably at least 77.1 m/s, with the upper limit being no more than 77.724 m/s. If the initial velocity is too much lower than these values, the ball may not travel as far as desired. On the other hand, if the initial velocity exceeds the upper limit of 77.724 m/s, it will fail to meet the standard set by the R&A (USGA), and will thus be ineligible for registration as an official ball.

Condition (II)

The value expressed as (deflection of intermediate layer-covered sphere)/(core deflection) must be at least 0.87 but not more than 0.97, and is preferably at least 0.88 and not more than 0.96, and more preferably at least 0.9 but not more than 0.95. If this value is too small, the feel of the ball when played with a putter will be hard and the spin rate of the ball when hit with a driver (W#1) will increase, which is inappropriate for the dimples used in the invention. On the other hand, if the above value is too large, the spin rate of the ball on shots with a driver will increase, which is inappropriate for the dimples of the invention.

Condition (III)

The combined thickness of the intermediate layer and the cover must be not more than 3.0 mm, preferably between 0.5 and 3 mm, more preferably between 1.0 and 2.8 mm, and even more preferably between 2.0 and 2.6 mm. If the combined thickness is too small, the durability of the ball to cracking on repeated impact will worsen. On the other hand, if the combined thickness is too large, the ball will take on more spin on shots with a driver, which is inappropriate for the dimples used in the invention.

Condition (IV)

The value expressed as (ball deflection)/(deflection of intermediate layer-covered sphere) must be no more than 0.98, preferably between 0.85 and 0.95, and more preferably between 0.88 and 0.92. If this value is too small or too large, the ball will take on too much spin on shots with a driver, which is inappropriate for the dimples used in the invention.

Figure 5:
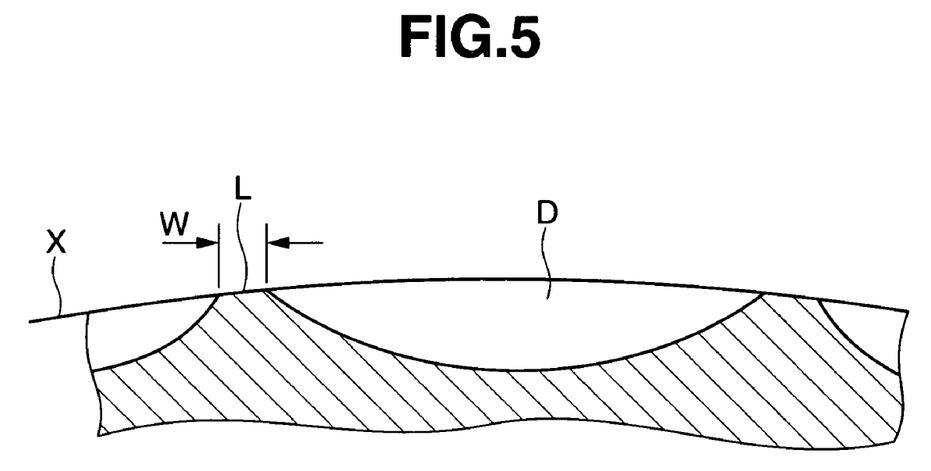
FIG. 5 illustrates the relative positions of the ball surface, a dimple and a land area.

In the inventive golf ball having the above-described internal construction, a plurality of dimples, including non-circular dimples, are formed on the surface of the ball. The dimples have network-like or lattice-like land areas, delineated by substantially parallel contour lines, present between neighboring dimples. In the practice of the invention, the lands have a width which is adjusted within a range of from 0.05 mm to 1.0 mm, and preferably from 0.1 mm to 0.8 mm. If the width of the foregoing interval is too small, the dimples tend to deform easily when the ball is hit. On the other hand, if the interval width is too large, the surface coverage by the dimples may be too small, resulting in a poor flight performance. As shown in FIG. 5, "interval width" refers herein to the width w of the land L at the surface thereof which coincides with the outermost peripheral face X of the ball.

In the practice of the invention, the non-circular dimples must have non-circular inside corners which are curved. The corner shape of non-circular dimples generally lacks smoothness at the surface, as a result of which frictional resistance with air becomes large, which keeps the ball from traveling as far as desired. Hence, the corners are finished to a curved surface having a specific radius of curvature R. This curved area does not have a constant curvature and the radius of curvature R at the smallest portion thereof, while not subject to any particular limitation, is adjusted within a range of preferably between 0.1 and 5.0 mm, and more preferably between 1.0 and 3.0 mm. The outside surfaces of the lands delineated by the substantially parallel contour lines define the outermost peripheral face of the ball, and are advantageous in that the outermost peripheral face of the ball is not easily marred.

The dimples used in the invention are preferably a mixture of circular dimples and non-circular dimples. In such a case, it is preferable for the circular dimples to account for at least 30% of the total number of dimples.

From the standpoint of the aerodynamic performance of the ball, the number of dimples is preferably between 250 and 350, and more preferably between 270 and 350.

Also, from the standpoint of the aerodynamic performance of the ball, the surface coverage of the dimples is preferably at least 75%, more preferably at least 80%, and even more preferably at least 81%.

Three-dimensional CAD/CAM may be used to fabricate a mold for molding this ball. Specifically, the mold may be fabricated using a technique in which the entire surface shape is cut three-dimensionally into a master mold from which golf ball molds are subsequently made by pattern reversal, or using a technique in which the inside walls of the golf ball mold cavity are directly cut three-dimensionally.

The deflection of the golf ball when compressed under a final load of 130 kgf from an initial load of 10 kgf, while not subject to any particular limitation, is preferably at least 2.5 mm, and more preferably at least 2.8 mm. The upper limit is preferably not more than 3.6 mm, and more preferably not more than 3.3 mm. If this value is too small, that is, if the ball is too hard, it may have a poor feel on impact and a poor scuff resistance. On the other hand, if the ball is too soft, it may deform too much when played with a driver, possibly resulting in a poor rebound.

The golf ball of the invention may be formed to a diameter of generally not less than 42.67 mm, preferably between 42.67 and 43.00 mm, and a weight of generally between 45.0 and 45.93 g. Moreover, to this end, it is desirable for the ball to conform to the 2006 Rules of Golf of the R&A. That is, it is desirable for (1) the ball to not pass through a ring having an inside diameter of 42.672 mm, (2) for the ball to weigh not more than 45.93 g, and (3) for the ball to have an initial velocity of not more than 77.724 m/s.

As explained above, the golf ball of the present invention, through the combination of a reduced air resistance owing to the dimple shapes and a low-spin construction, provides an increased distance and a stable flight performance.

EXAMPLES

Examples of the invention and Comparative Examples are given below by way of illustration, and not by way of limitation.

Examples 1 and 2, Comparative Example 1 to 7

Rubber materials of the formulations shown in Table 1 were furnished when fabricating the golf balls in Examples 1 and 2 of the invention and Comparative Examples 1 to 7. Numbers shown for the various materials in the table below indicate parts by weight.

TABLE 1

|  |  | Example | | Comparative Example | | | | | | |
|---|---|---|---|---|---|---|---|---|---|---|
|  |  | 1 | 2 | 1 | 2 | 3 | 4 | 5 | 6 | 7 |
| Core formulation | Polybutadiene A | 0 | 0 | 0 | 0 | 0 | 0 | 50 | 50 | 0 |
|  | Polybutadiene B | 100 | 100 | 100 | 100 | 85 | 100 | 50 | 50 | 100 |
|  | Polyisoprene | 0 | 0 | 0 | 0 | 15 | 0 | 0 | 0 | 0 |
|  | Zinc acrylate | 35.3 | 33.8 | 36.8 | 36.8 | 33.8 | 35.3 | 23.5 | 23.5 | 36.8 |
|  | Peroxide (1)[1] | 0 | 0 | 0 | 0 | 0 | 0 | 0.6 | 0.6 | 0 |
|  | Peroxide (2)[2] | 3 | 3 | 3 | 3 | 3 | 3 | 0.6 | 0.6 | 3 |
|  | Sulfur[3] | 0.1 | 0.1 | 0.1 | 0.1 | 0.1 | 0.1 | 0 | 0 | 0.1 |
|  | Antioxidant[4] | 0 | 0 | 0 | 0 | 0 | 0 | 0.1 | 0.1 | 0 |
|  | Zinc oxide | 25.2 | 25.7 | 29.5 | 29.5 | 34.0 | 25.2 | 28.4 | 28.4 | 24.6 |
|  | Zinc salt of pentachlorothiophenol | 1.5 | 1.5 | 1.5 | 1.5 | 1.5 | 0.1 | 0.1 | 1.5 | 1.5 |
| Organosulfur compound (zinc salt of pentachlorothiophenol)/sulfur | | 15 | 15 | 15 | 15 | 15 | 15 | — | — | 15 |
| Vulcanization method | Temperature (° C.) | 157 | 157 | 157 | 157 | 157 | 157 | 157 | 157 | 157 |
|  | Time (min) | 15 | 15 | 15 | 15 | 15 | 15 | 15 | 15 | 15 |

The above materials are explained below.
Polybutadiene A: Produced by JSR Corporation under the trade name "BR01."
Polybutadiene B: Produced by JSR Corporation under the trade name "BR730."
Polyisoprene: Produced by JSR Corporation under the trade name "IR2200."
[1])Peroxide (1): Dicumyl peroxide produced by NOF Corporation under the trade name "Percumyl D."
[2])Peroxide (2): A mixture of 1,1-di(t-butylperoxy)cyclohexane and silica, produced by NOF Corporation under the trade name "Perhexa C-40."
[3])Sulfur: Zinc white-sulfur mixture, produced by Tsurumi Chemical Industry Co., Ltd.
[4])Antioxidant: Produced by Ouchi Shinko Chemical Industry Co., Ltd. under the trade name "Nocrac NS-6."

Next, intermediate layer material A, C or D and cover material B or E shown in Table 2 below were successively injection-molded over the above core to produce a three-piece solid golf ball. In addition, the dimples shown in FIGS. 1 to 3 were formed on the surface of the ball, thereby fabricating the golf balls in the respective examples of the invention and comparative examples. Details concerning the internal ball construction (thicknesses, hardnesses, initial velocities, etc.) and the dimples in each example of the invention and each comparative example are presented in Table 3.

TABLE 2

|  | A | B | C | D | E |
|---|---|---|---|---|---|
| AM 7331[8] | 85 |  |  |  |  |
| Surlyn 8120[5] |  |  |  |  | 35 |
| AM 7311[6] |  | 15 |  |  |  |
| AM 7317[7] |  |  | 50 |  |  |
| AM 7318[7] |  |  | 50 |  |  |
| Himilan 1557[8] |  | 35 |  |  |  |
| Himilan 1605[8] |  | 35 |  |  |  |
| Himilan 1855[8] |  | 15 |  |  | 35 |
| AN 4318[9] |  |  |  |  | 30 |
| Hytrel 3046[10] |  |  |  | 100 |  |
| Dynaron E6100P[11] | 15 |  |  |  |  |
| Behenic acid[12] | 20 |  |  |  |  |
| Calcium hydroxide[13] | 2.9 | 2.7 |  |  |  |
| Titanium oxide |  |  | 5 |  | 5 |
| MFR[14] | 3.3 | 2.8 | 1.7 | 10 | 5 |

Note:
The numbers in the table indicate parts by weight.
The above materials are explained below.
[5])An ionomer produced by E. I. DuPont de Nemours & Co.
[6])A magnesium ionomer produced by DuPont-Mitsui Polychemicals Co., Ltd.
[7])High-stiffness ionomer resins produced by DuPont-Mitsui Polychemicals Co., Ltd.
AM 7317: A zinc ionomer having an acid content of 18%
AM 7318: A sodium ionomer having an acid content of 18%
[8])An ionomer produced by DuPont-Mitsui Polychemicals Co., Ltd.
[9])Nucrel, produced by DuPont-Mitsui Polychemicals Co., Ltd.
[10])A polyester elastomer produced by DuPont-Toray Co., Ltd.
[11])A hydrogenated polymer produced by JSR Corporation.
[12])NAA222-S (beads), produced by NOF Corporation.
[13])CLS-B, produced by Shiraishi Kogyo.
[14])The melt flow rate of the material, as measured in accordance with JIS K-6760 at a test temperature of 190° C. and under a test load of 21 N (2.16 kgf).

TABLE 3

|  |  | Example | | Comparative Example | | | | | | |
|---|---|---|---|---|---|---|---|---|---|---|
|  |  | 1 | 2 | 1 | 2 | 3 | 4 | 5 | 6 | 7 |
| Core | Diameter (mm) | 37.7 | 37.7 | 36.3 | 36.3 | 37.7 | 37.7 | 37.8 | 37.8 | 37.7 |
|  | Weight (g) | 33.8 | 33.9 | 31.0 | 31.0 | 33.6 | 33.0 | 34.0 | 34.0 | 33.7 |
|  | Deflection (mm) | 3.8 | 3.7 | 3.5 | 3.5 | 3.7 | 3.6 | 3.9 | 3.9 | 3.5 |
|  | Initial velocity (m/s) | 77.8 | 77.8 | 77.8 | 77.8 | 77.3 | 77.8 | 77.8 | 77.8 | 77.8 |
|  | Surface hardness (D) | 55.5 | 55.1 | 57.5 | 57.5 | 55.1 | 55.5 | 50.3 | 50.3 | 57.5 |
|  | Center hardness (D) | 37.0 | 36.5 | 37.7 | 37.7 | 36.5 | 37.0 | 39.0 | 39.0 | 37.7 |
|  | Core surface hardness (D) − center hardness (D) | 18.5 | 18.6 | 19.8 | 19.8 | 18.6 | 18.5 | 11.3 | 11.3 | 19.8 |

TABLE 3-continued

Figure 1:
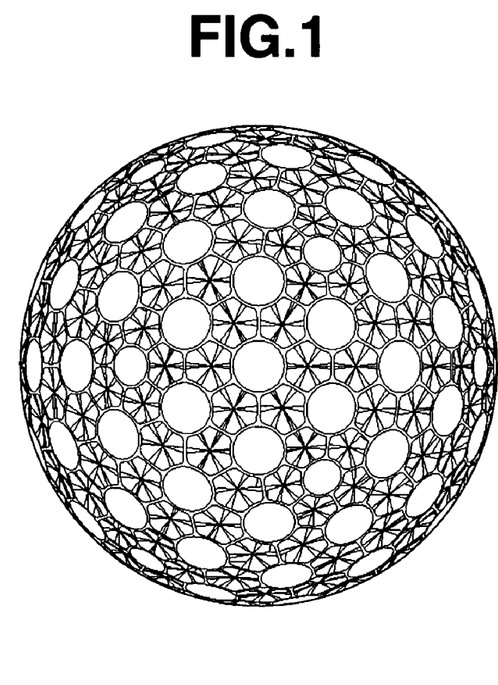
FIG. 1 shows the dimple arrangement used in one example of the invention and one comparative example.
Figure 2:
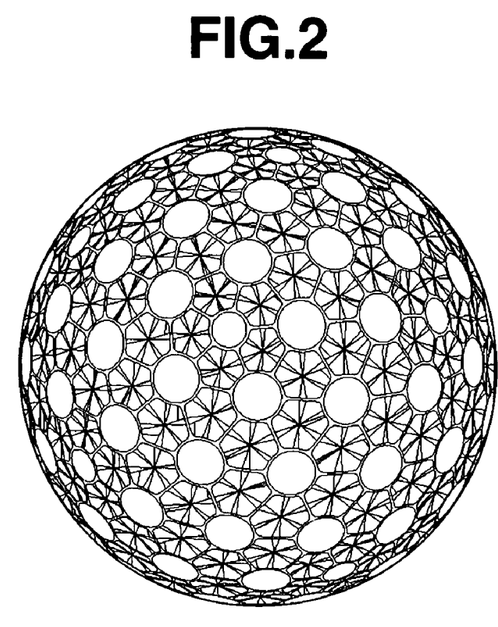
FIG. 2 shows the dimple arrangement used in the other example of the invention and some of the comparative examples.
Figure 3:
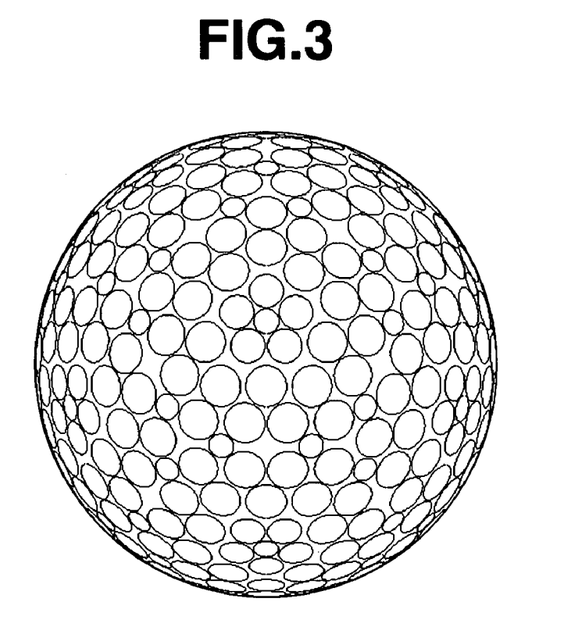
FIG. 3 shows the dimple arrangement used in the remaining comparative examples.

|  |  | Example |  | Comparative Example |  |  |  |  |  |  |
|---|---|---|---|---|---|---|---|---|---|---|
|  |  | 1 | 2 | 1 | 2 | 3 | 4 | 5 | 6 | 7 |
| Intermediate layer | Type | A | A | A | A | C | D | A | A | A |
|  | Specific gravity | 0.94 | 0.94 | 0.94 | 0.94 | 0.98 | 1.07 | 0.94 | 0.94 | 0.94 |
|  | Sheet hardness (D) | 51 | 51 | 51 | 51 | 65 | 30 | 51 | 51 | 51 |
|  | Gauge (mm) | 1.26 | 1.25 | 1.6 | 1.6 | 1.25 | 1.26 | 1.23 | 1.23 | 1.25 |
| Intermediate layer-covered sphere | Diameter (mm) | 40.2 | 40.2 | 39.5 | 39.5 | 40.2 | 40.2 | 40.2 | 40.2 | 40.2 |
|  | Weight (g) | 39.5 | 39.6 | 37.8 | 37.8 | 39.5 | 39.4 | 39.6 | 39.6 | 39.5 |
|  | Deflection (mm) | 3.3 | 3.5 | 3.1 | 3.1 | 3.2 | 3.7 | 3.7 | 3.7 | 3.2 |
| Cover | Type | B | B | B | B | B | B | B | B | E |
|  | Specific gravity | 0.96 | 0.96 | 0.96 | 0.96 | 0.96 | 0.96 | 0.96 | 0.96 | 0.96 |
|  | Sheet hardness (D) | 59 | 59 | 59 | 59 | 59 | 59 | 59 | 59 | 48 |
|  | Gauge (mm) | 1.25 | 1.25 | 1.6 | 1.6 | 1.25 | 1.25 | 1.23 | 1.23 | 1.25 |
| Ball | Diameter (mm) | 42.7 | 42.7 | 42.7 | 42.7 | 42.7 | 42.7 | 42.7 | 42.7 | 42.7 |
|  | Weight (g) | 45.5 | 45.6 | 45.5 | 45.5 | 45.5 | 45.5 | 45.6 | 45.6 | 45.5 |
|  | Deflection (mm) | 3.0 | 3.1 | 2.8 | 2.8 | 2.9 | 3.4 | 3.4 | 3.4 | 3.2 |
|  | Initial velocity (m/s) | 77.4 | 77.4 | 77.2 | 77.2 | 77.4 | 77.4 | 77.4 | 77.4 | 76.6 |
| Cover hardness − intermediate layer hardness |  | 8 | 8 | 8 | 8 | −6 | 29 | 8 | 8 | −3 |
| Core initial velocity − ball initial velocity (m/s) |  | 0.4 | 0.5 | 0.6 | 0.6 | −0.1 | 0.4 | 0.4 | 0.4 | 1.2 |
| (Deflection of intermediate layer-enclosed sphere)/(core deflection) |  | 0.92 | 0.93 | 0.89 | 0.89 | 0.86 | 1.03 | 0.95 | 0.95 | 0.91 |
| Cover gauge + intermediate layer gauge |  | 2.51 | 2.50 | 3.20 | 3.20 | 2.50 | 2.50 | 2.46 | 2.46 | 2.50 |
| (Ball deflection)/(intermediate layer-covered sphere deflection) |  | 0.90 | 0.90 | 0.90 | 0.90 | 0.91 | 0.92 | 0.91 | 0.91 | 1.00 |
| Dimples | Dimple pattern arrangement | FIG. 1 | FIG. 2 | FIG. 1 | FIG. 3 | FIG. 2 | FIG. 2 | FIG. 2 | FIG. 3 | FIG. 2 |
|  | Total number of dimples | 332 | 326 | 332 | 432 | 326 | 326 | 326 | 432 | 326 |
|  | Circular dimples | 112 | 110 | 112 | 432 | 110 | 110 | 110 | 432 | 110 |
|  | Non-circular dimples | 220 | 216 | 220 | 0 | 216 | 216 | 216 | 0 | 216 |
|  | Proportion of dimples that are circular (%) | 33.7 | 33.7 | 33.7 | 100 | 33.7 | 33.7 | 33.7 | 100 | 33.7 |

Deflection

The deformation (mm) of the core, the sphere composed of the core enclosed by the intermediate layer, and the ball when compressed under a final load of 1,275 N (130 kgf) from an initial load state of 98 N (10 kgf) were each measured.

Type D Durometer Hardnesses of Core Surface and Core Center

For the core surface, the durometer indenter was set perpendicular to the spherical surface of the core, and the hardness was measured with a type D durometer in accordance with ASTM D2240. For the core center, the core was cut into two and the type D durometer hardness at the center of the cutting plane was measured.

Type D Durometer Hardness of Intermediate Layer and Cover (Material Hardness)

The cover composition was formed under heat and pressure to a thickness of about 2 mm and the resulting sheet was held for two weeks at 23° C., following which the type D durometer hardness was measured in accordance with ASTM D2240.

Initial Velocity

The initial velocity of the spherical object (ball or core) was measured using an initial velocity measuring apparatus of the same type as the USGA drum rotation-type initial velocity-instrument approved by the R&A. The ball was temperature-conditioned for at least 3 hours at 23±1° C., then tested in a chamber at a room temperature of 23±2° C. by being hit with a 250-pound (113.4 kg) head (striking mass) at an impact velocity of 143.8 ft/s (43.83 m/s). A dozen balls were hit four times each. The time taken for the ball to traverse a distance of 6.28 ft (1.91 m) was measured and used to compute the initial velocity (m/s) of the ball. This cycle was carried out over a period of about 15 minutes.

Proportion of Dimples that are Circular (%)

This value was obtained by dividing the number of circular dimples by the total number of dimples, then multiplying by 100 to give a percentage.

The performances of the balls obtained in the respective examples of the invention and the comparative examples were rated by the test methods described below. The results are shown in Table 4.

Flight Performance

A driver (W#1) was mounted on a swing robot, and the distance traveled by the ball when hit at a head speed of 45 m/s was measured. The club used was a TourStage XD 405 having a loft angle of 9° manufactured by Bridgestone Sports Co., Ltd.; 9.5°).

Good: Total distance was 224.0 or more
NG: Total distance was less than 224.0

Feel

Sensory evaluations were carried out according to the following criteria by ten amateur golfers having head speeds of 45 to 50 m/s using a driver (W#1) clubs. Ratings were based on the following criteria.

Good: At least 7 of the 10 golfers thought the ball had a good feel.
NG: Four or fewer of the 10 golfers thought the ball had a good feel.

In addition, the feel of the ball when hit with a putter was sensory evaluated according to the above criteria by ten amateur golfers.

Durability to Cracking

A driver (W#1) was mounted on a swing robot, and the durability was evaluated as the number of times the ball had been repeatedly struck at a head speed of 45 m/s when cracks began to form on the surface of the ball. The average value for N=3 balls was used as the basis for evaluation in each example. The number of times the ball obtained in Example 2 had been hit when it began to crack was assigned an arbitrary index of 100, based upon which the durability to cracking by the balls obtained in the respective examples were rated according to the following criteria.

Good: Durability index was 95 or more
    NG: Durability index was less than 95

Scuff Resistance

A non-plated pitching sand wedge was set in a swing robot, and the ball was hit once at a head speed of 40 m/s, following which the surface state of the ball was rated as follows.

Good: Can be used again
    NG: Cannot be used again In Comparative Example 5, because the (core surface D hardness–core center D hardness) value was less than 15, the spin rate lowering effect was inadequate, resulting in a shorter than desirable distance.

In Comparative Example 6, the combination of the Comparative Example 5 construction with the use of dimples that were all circular resulted in a poor carry when the ball was hit with a driver, and thus a less than desirable distance.

In Comparative Example 7, the cover was soft and the rebound was low, resulting in a less than desirable distance.

The invention claimed is:

1. A golf ball comprising a core, a cover, and an intermediate layer between the core and the cover, which ball has a surface with a plurality of non-circular dimples thereon, wherein the cover is harder than the intermediate layer, the ball surface has land areas having a width of from 0.05 to 1.0 mm, the lands having outer surfaces that define an outermost peripheral face of the ball, the non-circular dimples have non-circular inside corners that are curved, and the ball satisfies conditions (I) to (IV) below:

TABLE 4

| | | Example | | Comparative Example | | | | | | |
|---|---|---|---|---|---|---|---|---|---|---|
| | | 1 | 2 | 1 | 2 | 3 | 4 | 5 | 6 | 7 |
| Flight W#1 HS 45 m/s | Carry (m) | 218.5 | 218.3 | 216.4 | 215.4 | 217.3 | 214.0 | 214.7 | 212.7 | 212.8 |
| | Total distance (m) | 225.9 | 226.1 | 222.5 | 221.7 | 224.4 | 222.1 | 223.1 | 221.3 | 219.5 |
| | Spin rate (rpm) | 2731 | 2622 | 3009 | 3017 | 2884 | 2867 | 2843 | 2811 | 3139 |
| | Flight performance | good | good | NG | NG | good | NG | NG | NG | NG |
| Feel on shots with W#1 | | good | good | good | good | good | good | good | good | good |
| Feel on shots with a putter | | good | good | good | good | NG | good | good | good | good |
| Durability to cracking | | good | good | good | good | NG | NG | good | good | good |
| Scuff resistance | | good | good | good | good | good | good | good | good | NG |

As is apparent from the results in Table 4, the golf balls in the respective comparative examples had ball performances which were inferior in the manner described below to the balls obtained in the examples of the invention.

In Comparative Example 1, because the combined thickness of intermediate layer and cover had a large gauge, the ball had a somewhat diminished rebound. Moreover, the ball had a high spin rate on shots with a driver, as a result of which a sufficient distance was not achieved.

In Comparative Example 2, the combination of the Comparative Example 1 ball construction with the use of dimples that were all circular resulted in a poor carry when the ball was hit with a driver, and thus a less than desirable distance.

In Comparative Example 3, because the (deflection of intermediate layer-covered sphere)/(core deflection) value was less than 0.87 and the intermediate layer was harder than the cover, the ball had a poor durability to cracking on repeated impact and a poor feel when played with a putter.

In Comparative Example 4, because the (deflection of intermediate layer-covered sphere)/(core deflection) value exceeded 0.97, the ball had a high spin rate when played with a driver, resulting in a shorter than desired distance, in addition to which the durability to cracking under repeated impact was poor.

(I) (core initial velocity)−(ball initial velocity)≧0;

(II) 0.87≦(deflection of intermediate layer-covered sphere)/(core deflection)≦0.97;

(III) combined thickness of intermediate layer and cover≦3.0 mm; and (IV) (ball deflection)/(deflection of intermediate layer-covered sphere)≦0.98.

2. The golf ball of claim 1, wherein the core is made of a rubber composition comprising 100 parts by weight of a base rubber, from 0.05 to 0.5 part by weight of sulfur and from 0.05 to 5 parts by weight of an organosulfur compound, and the organosulfur compound and the sulfur together satisfy the condition:

1≦(amount of organosulfur compound)/(amount of sulfur)≦30.

3. The golf ball of claim 1 having on the surface thereof a mixture of circular dimples and non-circular dimples.

4. The golf ball of claim 1, wherein circular dimples account for at least 30% of the total number of dimples.

5. The golf ball of claim 1, wherein the number of dimples is between 250 and 350.

6. The golf ball of claim 1, wherein the cover has a thickness of between 0.5 and 2.0 mm and a type D durometer hardness of at least 52 but not more than 62, the intermediate layer has a thickness of between 0.5 and 1.6 mm and a type D durometer hardness of at least 40 but not more than 60, and the ball has an initial velocity of at least 76.5 m/s.

7. The golf ball of claim 1 which satisfies, as condition (IV), the relationship:

0.85≦(ball deflection)/(deflection of intermediate layer-covered sphere)≦0.95.

8. The golf ball of claim 1, wherein the intermediate layer includes (A) an ionomer resin composed of (a-1) an olefin-unsaturated carboxylic acid random copolymer and/or a metal ion neutralization product of an olefin-unsaturated carboxylic acid random copolymer and (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio (a-1)/(a-2) of between 100/0 and 0/100, and (B) a non-ionomeric thermoplastic elastomer in a weight ratio A/B of between 100/0 and 50/50.

9. The golf ball of claim 8, wherein the intermediate layer is made of a mixture comprised of 100 parts by weight of a resin component which includes the ionomer resin (A) and the non-ionomeric thermoplastic elastomer (B) in a weight ratio A/B of between 100/0 and 50/50, (C) between 5 and 80 parts by weight of an organic fatty acid having a molecular weight of between 280 and 1500 and/or a derivative thereof, and (D) between 0.1 and 10 parts by weight of a basic inorganic metal compound capable of neutralizing the un-neutralized acid groups in the resin component and component C.

10. The golf ball of claim 1, wherein the dimples have a surface coverage, based on the surface area of the ball, of at least 75%.

11. The golf ball of claim 1, wherein the hardness difference between the surface of the core and the center of the core, according to the relationship (core surface hardness)−(core center hardness) expressed in type D durometer hardness units, is at least 12 but not more than 30.

12. The golf ball of claim 1, wherein the cover is harder than the intermediate layer by the hardness difference in type D durometer hardness units of 5 to 15.

* * * * *